United States Patent
Timm

(10) Patent No.: US 9,546,023 B1
(45) Date of Patent: Jan. 17, 2017

(54) PLASTIC BAG HOLDING AND FILLING APPARATUS

(71) Applicant: Nathan Timm, Ovid, MI (US)

(72) Inventor: Nathan Timm, Ovid, MI (US)

( * ) Notice: Subject to any disclaimer, the term of this patent is extended or adjusted under 35 U.S.C. 154(b) by 0 days.

(21) Appl. No.: 14/880,246

(22) Filed: Oct. 11, 2015

(51) Int. Cl.
   *B65D 35/56* (2006.01)
   *B65D 33/14* (2006.01)
   *F16B 45/00* (2006.01)

(52) U.S. Cl.
   CPC ............ *B65D 33/14* (2013.01); *F16B 45/00* (2013.01)

(58) Field of Classification Search
   CPC ........ A47G 21/028; B65B 67/00; B65B 67/02
   See application file for complete search history.

(56) References Cited

U.S. PATENT DOCUMENTS

| | | | | |
|---|---|---|---|---|
| 1,255,902 A | * | 2/1918 | Marriott | A47L 13/52 15/117 |
| 4,279,437 A | * | 7/1981 | Goldbarg | E01H 1/1206 294/1.4 |
| 5,575,520 A | * | 11/1996 | Northcutt | E01H 1/1206 141/108 |

* cited by examiner

*Primary Examiner* — Amy Sterling
(74) *Attorney, Agent, or Firm* — Gulf Coast Intellectual Property Group

(57) ABSTRACT

A plastic bag holding and filling apparatus that is operable to assist in the holding and filling of a plastic bag. The plastic bag holding and filling apparatus includes a body having a bottom that is planar in manner and rectangular in shape. The body further includes a first lateral edge and second lateral edge. Extending upward from the first lateral edge is a first side panel. A second side panel is formed along the second lateral edge and is perpendicular thereto. The body includes a ramp secured to the second end. The ramp includes a hingedly secured first portion and second portion. A bag guide is secured to the second portion of the ramp and is manufactured from wire and further including opposing lower corners that are rounded in shape. A first hook and second hook are secured to the first side panel and second side panel.

8 Claims, 2 Drawing Sheets

PLASTIC BAG HOLDING AND FILLING APPARATUS

FIELD OF THE INVENTION

The present invention relates generally to product handling systems, more specifically but not by way of limitation, an apparatus that is operable to receive products thereon and direct into an open bag wherein the open bag is operably coupled to the apparatus.

BACKGROUND

The standard checkout line in grocery stores and numerous other retail stores are typically configured in the same manner. A counter is present that provides a surface for a shopper to place the objects for purchase thereon. A cashier will grasp and item and typically scan the barcode in order to register the item with the cash register and calculate the total amount due for the objects purchased. As the cashier is scanning the items the items are typically pushed to the end of the counter where another employee is sometimes available and will begin to place the objects purchased in a bag, most commonly a plastic bag.

One problem with existing checkout counters is the reliance on second employee being present to provide services of bagging the objects being purchased. On many occasions either during slow or busy times of the store employees are either not staffed or they are unavailable due to the workload. This can create delays in the bagging and thus the completion of the checkout process. Additionally, conventional plastic shopping bags are stored available for use on a rack that has proven difficult to use. As is known in the art, plastic bags are stored for use on wire stands typically having two arms that support a multitude of plastic bags. An individual desiring to open one of the plastic bags, typically the outer plastic bag, must often perform an exercise in dexterity using fingers to peel the outer bag so as to place the outer bag in the open position for filling.

Another issue with conventional checkout counters and plastic bag holders is the inability of conventional bag holders to hold the bag in an open position. This drastically slows the bagging process and as such the checkout process for the customer.

Accordingly, there is a need for a checkout counter attachment that includes an apparatus operable to assist in the filling of a plastic shopping bag wherein the apparatus is operable to receive objects thereon and direct the objects into an open plastic bag operably secured thereto.

SUMMARY OF THE INVENTION

It is the object of the present invention to provide an apparatus that is operable to assist in the process of filling a plastic bag during the checkout process that includes a receiving portion that is operable to receive objects thereon.

Another object of the present invention is to provide an apparatus that is operable to expedite the process of bagging items during the checkout process wherein the receiving portion includes a bottom surface and a plurality of integrated walls extending upward therefrom.

A further object of the present invention is to provide an apparatus that is operable to assist in the process of filling a plastic bag during the checkout process wherein the bottom surface further includes a forward perimeter edge that includes a bag support guide ramp.

An additional object of the present invention is to provide an apparatus that is operable to expedite the process of bagging items during the checkout process that further includes a first bag hook and a second bag hook on opposing sidewalls.

An alternative object of the present invention is to provide an apparatus that is operable to assist in the process of filling a plastic bag during the checkout process wherein the bag support guide ramp is adjustable to various angles.

Yet another object of the present invention is to provide an apparatus that is operable to expedite the process of bagging items during the checkout process that further includes a plurality of mounting tabs operable to secure the apparatus to a checkout counter.

Still another object of the present invention is to provide an apparatus that is operable to assist in the process of filling a plastic bag during the checkout process wherein the apparatus is manufactured from stainless steel and is rectangular in shape.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
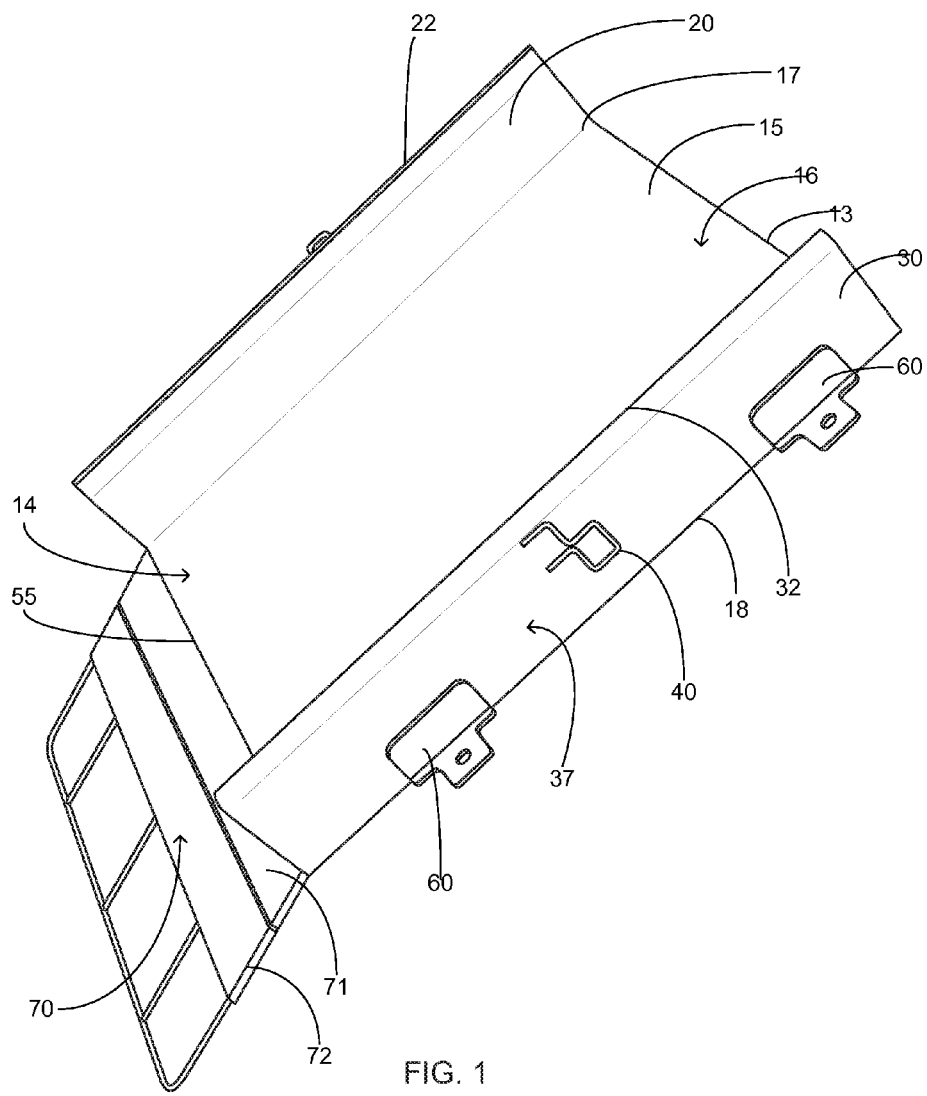
FIG. 1 is a side perspective view of the present invention.
Figure 2:
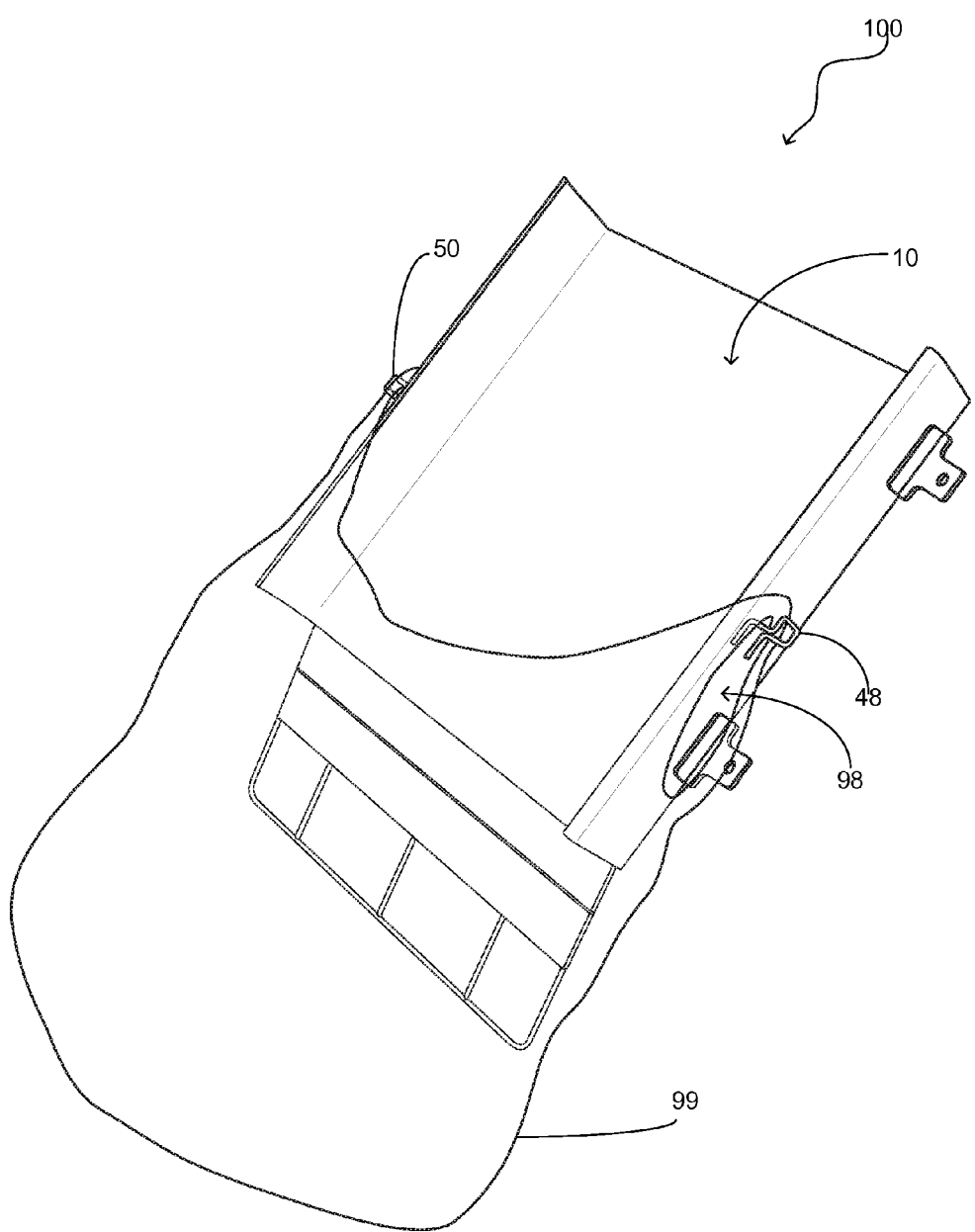
FIG. 2 is a perspective view of the present invention with an exemplary plastic bag coupled thereto.

Referring now to the drawings submitted herewith, wherein various elements depicted therein are not necessarily drawn to scale and wherein through the views and figures like elements are referenced with identical reference numerals, there is illustrated an plastic bag holding apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith the plastic bag holding apparatus 100 further includes a body 10 wherein the body 10 is rectangular in shape and is manufactured from a suitable durable material such as but not limited to stainless steel. The body 10 includes a bottom 15 having upper surface 16. While no particular size for the bottom 15 is required, good results have been achieved by utilizing a bottom that is approximately fifteen inches in width and seventeen inches in length. Those skilled in the art will recognize that the bottom 15 could be manufactured in numerous different sizes. The bottom 15 further includes a first lateral edge 17 and a second lateral edge 18. The bottom 15 includes first end 13 and second end 14. Extending upward from the first lateral edge 17 and contiguously formed therewith is the first side panel 20. The first side panel 20 is rectangular in shape and further includes upper edge 22 distal to the first lateral edge 17. The first side panel 20 is perpendicular to the bottom 15 so as to assist in holding a conventional plastic bag 99 in an open position subsequent the conventional plastic bag 99 being secure to the plastic bag holding apparatus 100. The height of the first side panel 20 provides assistance with the aforementioned function. While no particular height is required for the first side panel 20, good results have been achieved utilizing a first side panel 20 that is approximately three inches in height.

Opposedly located to the first side panel 20 is the second side panel 30. The second side panel 30 is contiguously formed with the bottom 15 along second lateral edge 18. The second side panel 30 is constructed similarly to the first side panel 20 and is manufactured from a suitable durable material such as but not limited to stainless steel. The second side panel 30 includes upper edge 32 distal to the second lateral edge 18 and parallel therewith. While not particular height is required for the second side panel 30, good results have been achieved utilizing a second side panel 30 that is generally the same height as the first side panel 20, wherein the second side panel 30 is approximately three inches in height.

Secured to the outer surface 37 of the second side panel 30 is the second hook 40. Second hook 40 is secured to the second side panel 30 utilizing suitable durable techniques such as but not limited to welding. Second hook 40 is manufactured from a suitable durable material such as but not limited to metal wire and is formed in a manner so as to extend outwards from the second side panel 30 allowing a handle opening 98 of a conventional plastic bag to be secured thereon. It is contemplated within the scope of the present invention that the second hook 40 could be formed in numerous different shapes and sizes and still achieve the desired functionality as described herein.

Secured to the first side panel 20 is first hook 50. First hook 50 is manufactured in the same manner as the second hook 40 and is located directly across therefrom. The first hook 50 provides the identical functionality as described herein for the second hook 40.

Secured to the first side panel 20 and second side panel 30 are a plurality of mounts 60. The mounts 60 are secured to the body 10 utilizing suitable durable techniques and are operable to secure the plastic bag holding apparatus 100 to a counter or other suitable location wherein the plastic bag holding apparatus 100 is desired for use. The mounts 60 are opposedly located proximate first end 13 and second end 14 so as to provide stability of the body 10 subsequent securing to a surface. It is contemplated within the scope of the present invention that the plastic bag holding apparatus 100 could have various different quantities of mounts 60 secured thereto. Further more it is contemplated with the scope of the present invention that the mounts 60 could be constructed in alternative manners.

Secured to the forward edge 55 of the bottom 15 proximate first end 14 is ramp 70. Ramp 70 is planar in manner and extends outward from the forward edge 55 of the bottom 15. The ramp 70 includes a first portion 71 and a second portion 72. The first portion 71 and second portion 72 are hingedly secured utilizing suitable fasteners so as to provide a means to fold the second portion 72 under the first portion 71 or position such that the second portion 72 extends downward with respect to the first portion 71 so as to position in order to inhibit the second portion 72 from being an obstacle when the plastic bag holding apparatus 100 is not in use.

Fastened to the second portion 72 distal to the first portion 71 is bag guide 80. Bag guide 80 is manufactured from suitable durable material such as but not limited to metal wire and is operable to extend downward into the conventional plastic bag 99 subsequent a conventional plastic bag 99 being secured to the plastic bag holding apparatus 100. The bag guide 80 includes lower rounded corners 82 that are operable to inhibit damage to the conventional plastic bag 99. It is contemplated within the scope of the present invention that the bag guide 80 could be formed in various different shapes and sizes and still accomplish the desired objective stated herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A bag holding apparatus constructed to assist in the filling of the bag ensuing being coupled thereto comprising:

a body, said body having a bottom, said bottom being planar in manner, said body having a first end and a second end, said bottom having a first lateral edge and a second lateral edge, said body further including a first side panel, said first side panel being formed along said first lateral edge of said bottom, said body further including a second side panel, said second side panel opposedly located on said body from said first side panel, said second side panel formed along said second lateral edge;

a ramp, said ramp being secured to said bottom, said ramp being proximate said first end of said body, said ramp having a first portion and a second portion, wherein said first portion of said ramp and said second portion of said ramp are hingedly secured;

a bag guide, said bag guide being secured to said second portion of said ramp, said bag guide operable to extend into a plastic bag subsequent a plastic bag being secured the bag holding apparatus;

a first hook, said first hook being secured to said first side panel, said first hook extending outward from said first side panel, said first hook configured to engage a handle opening of a conventional plastic bag;

a second hook, said second hook being secured to said second side panel, said second hook extending outward from said second side panel, said second hook configured to engage a handle opening of a conventional plastic bag; and wherein the bag holding apparatus is operable to be secured to a counter or similar structure so as to assist in the holding and filling of a conventional plastic bag.

2. The bag holding apparatus as recited in claim 1, wherein said body further includes a plurality of mounts, said plurality of mounts being secured to said body, said plurality of mounts configured to secure the bag holding apparatus to a surface.

3. The bag holding apparatus as recited in claim 2, wherein the body is manufactured from stainless steel.

4. A plastic bag holding and filling apparatus that is operable to be mounted to a counter or similar surface comprising:

a body, said body having a bottom, said bottom being planar in manner, said body being rectangular in shape, said body having a first end and a second end, said bottom having a first lateral edge and a second lateral edge, said body further including a first side panel, said first side panel being formed along said first lateral edge of said bottom, said first side panel having an exterior surface, said body further including a second side panel, said second side panel opposedly located on said body from said first side panel, said second side panel formed along said second lateral edge, said second side panel having an exterior surface;

a ramp, said ramp being secured to said bottom, said ramp being proximate said first end of said body, said ramp having a first portion and a second portion, said first portion of said ramp and said second portion of said ramp being hingedly secured;

a first hook, said first hook being secured to said exterior surface of said first side panel, said first hook extending outward from said first side panel, said first hook configured to engage a handle opening of a conventional plastic bag; and a bag guide, said bag guide being secured to said second portion of said ramp, said bag guide being manufactured from metal wire, said bag guide having lower rounded corners, said bag guide operable to extend into a plastic bag subsequent a plastic bag being secured the bag holding apparatus.

5. The plastic bag holding and filling apparatus as recited in claim 4, a second hook, said second hook being secured to said exterior surface of said second side panel, said second hook extending outward from said second side panel, said second hook configured to engage a handle opening of a conventional plastic bag.

6. The plastic bag holding and filling apparatus as recited in claim 5, wherein said body further includes a plurality of mounts, said plurality of mounts being secured to said body, said plurality of mounts configured to secure the bag holding apparatus to a surface.

7. The plastic bag holding and filling apparatus as recited in claim 6, wherein said first portion of said ramp and said second portion of said ramp are hingedly secured.

8. The plastic bag holding and filling apparatus as recited in claim 7, wherein the body is manufactured from stainless steel.

* * * * *